US011190006B2

(12) United States Patent
Noonan et al.

(10) Patent No.: US 11,190,006 B2
(45) Date of Patent: Nov. 30, 2021

(54) QUENCH PROTECTION IN SUPERCONDUCTING MAGNETS (71) Applicant: Tokamak Energy Ltd., Abingdon (GB)

(72) Inventors: Paul Noonan, Kidlington (GB); Robert Slade, Abingdon (GB)

(73) Assignee: Tokamak Energy Ltd., Abingdon (GB)

(*) Notice: Subject to any disclaimer, the term of this patent is extended or adjusted under 35 U.S.C. 154(b) by 219 days.

(21) Appl. No.: 16/470,658

(22) PCT Filed: Dec. 14, 2017

(86) PCT No.: PCT/GB2017/053749
§ 371 (c)(1),
(2) Date: Jun. 18, 2019

(87) PCT Pub. No.: WO2018/115818
PCT Pub. Date: Jun. 28, 2018

(65) Prior Publication Data
US 2020/0091702 A1  Mar. 19, 2020

(30) Foreign Application Priority Data

Dec. 21, 2016 (GB) ..................... 1621902
Feb. 27, 2017 (GB) ..................... 1703132

(51) Int. Cl.
H02H 7/00 (2006.01)
G21B 1/05 (2006.01)
(Continued)

(52) U.S. Cl.
CPC ............ *H02H 7/001* (2013.01); *G21B 1/057* (2013.01); *G21B 1/21* (2013.01); *H01F 6/02* (2013.01)

(58) Field of Classification Search
CPC ..... H01F 6/06; H01F 6/04; H01F 6/02; H01F 6/008; H01F 41/048; H01F 7/20;
(Continued)

(56) References Cited

U.S. PATENT DOCUMENTS 5,627,709 A   5/1997 Salasoo
6,900,714 B1  5/2005 Huang et al.
(Continued)

FOREIGN PATENT DOCUMENTS

EP   0808009 A2   11/1997
GB   2525021 A    10/2015
(Continued)

OTHER PUBLICATIONS

Translation of Russian Patent Office Search Report for Application No. 2019122455 dated Feb. 11, 2021 (2 pages).
(Continued)

*Primary Examiner* — Bryan R Perez
(74) *Attorney, Agent, or Firm* — Michael Best & Friedrich LLP (57) ABSTRACT A toroidal field coil comprising a central column, a plurality of return limbs, a quench protection system, and a cooling system. The central column comprises IITS material. Each return limb comprises a quenchable section, two IITS sections, and a quenching 5 system. The quenchable section comprises superconducting material, and is configured to contribute towards a magnetic field of the toroidal field coil. The IITS sections comprise IITS material. The IITS sections electrically connect the quenchable section to the central column and are in series with the central column and the quenchable section. The quenching system is associated with the quenchable section 10 and configured to quench the quenchable section. The quench protection system is configured to detect quenches in the toroidal field coil and, in
(Continued)

response to detection of a quench, cause the quenching system to quench the superconducting material in one or more of the quenchable sections in order to dump energy from the toroidal field coil into the one or more quenchable sections. The cooling system is configured to cool each quenchable section to a temperature at which the superconducting material is superconducting. Each quenchable section has a heat capacity sufficient to cause a temperature of the quenchable section to remain below a first predetermined temperature when energy is dumped from the toroidal field coil into the quenchable section, and a resistivity sufficient to cause decay of the magnet's current quickly enough that the temperature of the quenched part of the HTS section remains below a second predetermined temperature.

20 Claims, 7 Drawing Sheets (51) Int. Cl.
*G21B 1/21* (2006.01)
*H01F 6/02* (2006.01)

(58) Field of Classification Search
CPC .... H01F 5/003; H01F 27/2804; H01F 27/289; H01F 27/36; G01R 33/3815
See application file for complete search history.

(56) References Cited

U.S. PATENT DOCUMENTS

| 2008/0007375 | A1 | 1/2008 | Frantz |
| 2011/0065584 | A1 | 3/2011 | Frantz et al. |
| 2013/0106545 | A1 | 5/2013 | Wang et al. |
| 2013/0293987 | A1 | 11/2013 | Joshi |
| 2014/0211900 | A1 | 7/2014 | Kingham et al. |
| 2016/0308110 | A1 | 10/2016 | Tanaka et al. |
| 2016/0351310 | A1 | 12/2016 | Rey |
| 2018/0248357 | A1* | 8/2018 | Ross ............... H02H 7/001 |

FOREIGN PATENT DOCUMENTS

| GB | 2529412 A | 2/2016 |
| JP | 2011238455 A | 11/2011 |
| KR | 20090020396 A | 2/2009 |
| KR | 20100101945 A | 9/2010 |
| WO | 2014204555 A1 | 12/2014 |
| WO | 2015/184263 A1 | 12/2015 |

OTHER PUBLICATIONS

International Preliminary Report on Patentability for related Application No. PCT/GB2017/053749 dated Jun. 25, 2019 (12 pages).
Search Report issued from the United Kingdom Patent Office for related Application No. GB1621902.4 dated Mar. 21, 2017 (4 pages).
Search Report issued from the United Kingdom Patent Office for related Application No. GB1703132.9 dated Jun. 22, 2017 (4 pages).
International Search with Written Opinion for related Application No. PCT/GB2017/053749 dated Feb. 16, 2018 (20 pages).
J Van Nugteren et al., "E3SPreSSO: A Quench Protection System for High Field Superconducting Magnets", Oct. 24, 2016, website:https://edms.cern.ch/ui/file/1728301/1 /2016E3spresso.pdf.
Nagato Yanagi et al., "Feasibility of HTS Magnet Option for Fusion Reactors", Plasma and Fusion Research, vol. 9, No. 0, Jan. 1, 2014, p. 1405013-1405013.

* cited by examiner

QUENCH PROTECTION IN SUPERCONDUCTING MAGNETS

FIELD OF THE INVENTION

The invention relates to superconducting magnets. More particularly, the invention relates to methods and apparatus for quench protection in such magnets, and especially in magnets for use in nuclear fusion reactors.

BACKGROUND

A superconducting magnet is an electromagnet formed from coils of a superconducting material. As the magnet coils have zero resistance, superconducting magnets can carry high currents with zero loss (though there will be some losses from non-superconducting components), and can therefore reach high fields with lower losses than conventional electromagnets.

Superconductivity only occurs in certain materials, and only at low temperatures. A superconducting material will behave as a superconductor in a region defined by the critical temperature of the superconductor (the highest temperature at which the material is a superconductor in zero applied magnetic field) and the critical field of the superconductor (the highest magnetic field in which the material is a superconductor at 0K). The temperature of the superconductor and the magnetic field present limit the current which can be carried by the superconductor without the superconductor becoming resistive (or "normal", used herein to mean "not superconducting"). There are two types of superconducting material: type I superconductors totally exclude magnetic flux penetration and have a low critical field, type II allow flux to penetrate the superconductor above the lower critical field within localized normal regions called flux vortices. They cease to be superconducting at the upper critical field. This feature enables them to be used in wires for construction of superconducting magnets. Significant effort is made to pin the flux vortex sites to the atomic lattice, which improves critical current at higher magnetic fields and temperatures.

Broadly speaking, there are two categories of type II superconductors. Low temperature superconductors (LTS) typically have critical temperatures (with no external magnetic field) below 20K, and high temperature superconductors (HTS) typically have critical temperatures above 40K. Many current HTS materials have critical temperatures above 77K, which allows the use of liquid nitrogen for cooling. However, it will be appreciated by those skilled in the art that LTS and HTS are differentiated by criteria other than critical temperature, and that HTS and LTS are terms of the art for certain classes of materials. In general (though not exclusively), HTS materials are ceramics, and LTS materials are metallic.

One problem which can occur in superconducting magnets is quenching. Quenching occurs when a part of the superconducting wire or coil enters the resistive state. This may occur due to fluctuations in temperature or magnetic field, or physical damage or defects in the superconductor (e.g. by neutron irradiation if the magnet is used in a fusion reactor). Due to the high currents present in the magnet, when even a small part of the superconductor becomes resistive, it quickly heats up. All superconducting wires are provided with some copper stabilizer for quench protection. The copper provides an alternative path for current if the superconductor becomes normal. The more copper that is present, the slower the temperature rises in the hot spot that forms around a region of quenched conductor.

In LTS magnets, when a quench occurs the "normal zone" will propagate rapidly—on the order of a few metres per second. This occurs due to the low heat capacity of all materials at low temperature, and the fact that LTS materials are generally operated much closer to their critical temperatures. This means that a quench propagates quickly in a LTS magnet, and the stored magnetic field energy dissipated in the quench will be spread throughout the magnet, warming it up.

HTS materials, being operated at high temperatures, have a higher specific heat capacity, so the energy required to bring a section of the wire to the normal state is much greater. This means that quenches are much less likely in HTS magnets than in LTS magnets. However, it also means that the normal zone propagation velocity is much slower—on the order of a few millimetres per second compared to metres per second in LTS magnets. Since the quench will initially only affect a small volume of the magnet, only that area will be resistive—and therefore the energy dissipated during the quench will be dumped into that small volume (or, more specifically, into the copper where the current from the normal zone is diverted). This concentration of energy can cause permanent damage to the HTS tape, e.g. melting, arc discharge, etc. This is further compounded as HTS magnets are typically indirectly cooled, rather than being immersed in a bath of liquid coolant—so the "spot" cooling power is reduced compared to LTS magnets.

The energy stored in the magnetic field is given by:

$$W = \tfrac{1}{2} \int B \cdot H \, dr$$

I.e. the greater the flux density and the higher the volume, the greater the stored energy of the magnet. The energy released by a large magnet can be on a similar order to a stick of dynamite. For an LTS magnet, this energy may be dissipated warming the whole magnet. For an HTS magnet without quench protection, this energy may be dissipated in a small fraction of the magnet's volume. In general a large HTS magnet will require an active quench protection system comprising a detection phase, during which the quench is detected before significant heating has occurred, followed by a dissipation phase, during which the magnet current is rapidly ramped down before the hot spot temperature rises too high.

Most HTS magnets built to date (using BSCCO and ReBCO coated conductors) do not in fact have quench protection. This is because they are mostly small, low cost prototypes, with little stored energy, and because a quench in a well-designed HTS magnet should have a very low probability, as mentioned. The decision whether to quench protect an HTS magnet is therefore essentially an economic one: a small prototype magnet can be repaired relatively easily in the rare event that it quenches. As a consequence, quench protection technology for HTS magnets is still immature.

One application of HTS magnets is in tokamak fusion reactors. A tokamak features a combination of strong toroidal magnetic field, high plasma current and, usually, a large plasma volume and significant auxiliary heating, to provide a hot stable plasma so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a habit of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept in the START tokamak at Culham demonstrated a huge increase in efficiency—the magnetic field required to contain a hot plasma can be reduced by a factor of 10. In addition, plasma stability is improved, and build costs reduced.

To obtain the fusion reactions required for economic power generation (i.e. much more power out than power in), the conventional tokamak has to be huge so that the energy confinement time (which is roughly proportional to plasma volume) can be large enough so that the plasma can be hot enough for thermal fusion to occur.

WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement magnet.

The primary attraction of HTS for tokamaks is the ability of HTS to carry high currents in intense magnetic fields. This is particularly important in compact spherical tokamaks (STs), in which the flux density on the surface of the centre column will exceed 20 T. A secondary benefit is the ability of HTS to carry high current in high magnetic field at higher temperatures than LTS, for example ~20 K. This enables use of a thinner neutron shield, resulting in higher neutron heating of the central column, which would preclude operation using liquid helium (ie: at 4.2 K or below). This in turn enables the design of a spherical tokamak with major plasma radius of less than about 2 m, for example about 1.4 m to be considered; such a device would recycle a few percent of its power output for cryogenic cooling.

Nevertheless, such magnets are much bigger than those previously designed using HTS material. The toroidal field (TF) magnet for even a relatively small tokamak would be, by far, the largest HTS magnet built to date, and represents a large magnet with high stored energy even by LTS standards. A thoroughly developed quench protection system which can cope with critical current degradation in the conductor is essential. The stored energy of the TF magnet (~4.5 T) for a spherical tokamak operating with a 60 cm major radius will be 150-200 MJ, and the TF magnet (~3 T) for a 140 cm tokamak will be in excess of 1200 MJ.

The role of a quench protection system is to detect a local quench, or "hot spot", either as soon as possible after starting, to minimise damage, or before initiation, by detecting the transfer of current from the superconductor to the copper stabilizer, and to open a circuit breaker to dump the magnet's stored energy into a resistive load. The energy dump may be achieved by routing current through a resistor outside the magnet's cryostat at room temperature, or by heating the "cold mass" of the magnet to make it become resistive, optionally using the magnet's own stored energy to artificially propagate the quench faster through the superconducting coils (so that the energy is dissipated through the whole magnet, which warms up gradually, rather than causing a steep temperature rise in the hot-spot). Artificial propagation is difficult in HTS magnets, because the heat required to quench the entire magnet is much larger than in LTS and difficult to implement in practice.

The E$^3$SPreSSO system, developed at CERN and detailed in the paper "E$^3$SPreSSO: A Quench Protection System for High Field Superconducting Magnets" (https://edms.cern.ch/ui/#!master/navigator/document?D: 1052094071:1052094071:sub Docs), avoids the issues with artificial quench propagation in HTS magnets by providing one or more non-inductively wound LTS coils in series with the HTS coils. When a quench (hot spot) is detected in the HTS sections, the LTS coil(s) can be quickly quenched (using heaters or other means, such as the CERN-developed CLIQ AC-loss method) to ensure that the magnet's stored energy is dumped into the LTS rather than the HTS. As noted above, quenches in LTS coils are generally non-destructive, and the non-inductively wound LTS coil can be designed such that the temperature rise resulting from the energy dump is too small to cause any damage. The E$^3$SPreSSO method combines the functions of the dump resistor and circuit breaker into a cold LTS section and moves them inside the magnet's cryostat, or into a thermally linked separate cryostat.

As such, the E$^3$SPreSSO unit operates much like the superconducting switches typically used to close the superconducting magnet circuit in persistent mode LTS magnets used for magnetic resonance applications. However, the heat capacity of such switches is low as they are not intended as energy dumps. Dumping the energy of an HTS magnet into a known LTS switch would likely cause it to melt, causing significant damage to both the switch and any nearby components.

SUMMARY

According to an aspect of the present invention, there is provided a toroidal field coil. The toroidal field coil comprises a central column, a plurality of return limbs, a quench protection system, and a cooling system. The central column comprises HTS material. Each return limb comprises a quenchable section, two HTS sections, and a quenching system. The quenchable section comprises superconducting material, and is configured to contribute towards a magnetic field of the toroidal field coil. The HTS sections comprise HTS material. The HTS sections electrically connect the quenchable section to the central column and are in series with the central column and the quenchable section. The quenching system is associated with the quenchable section and configured to quench the quenchable section. The quench protection system is configured to detect quenches in the toroidal field coil and, in response to detection of a quench, cause the quenching system to quench the superconducting material in one or more of the quenchable sections in order to dump energy from the toroidal field coil into the one or more quenchable sections. The cooling system is configured to cool each quenchable section to a temperature at which the superconducting material is superconducting. Each quenchable section has a heat capacity sufficient to cause a temperature of the quenchable section to remain below a first predetermined temperature when energy is dumped from the toroidal field coil into the quenchable section, and a resistivity sufficient to cause decay of the magnet's current quickly enough that the temperature of the quenched part of the HTS section remains below a second predetermined temperature.

According to a further aspect of the invention, there is provided a toroidal field coil. The toroidal field coil comprises a central column and a plurality of return limbs comprising turns of high temperature superconducting, HTS, material. The central column comprises an LTS core, and a HTS outer layer. The LTS core comprises LTS material and is configured to contribute towards a magnetic field of the toroidal field coil. The HTS outer layer surrounds the LTS core and comprises HTS material. The LTS core is in series with at least some turns of the return limbs and comprises a quenching system configured to cause a quench in the LTS core. The toroidal field coil further comprises a quench protection system and a cooling system. The quench protection system is configured to detect quenches and, in response to detection of a quench, cause the quenching system to quench the LTS core in order to dump energy from the toroidal field coil into the LTS core. The cooling system is configured to cool the LTS core to a temperature at which the LTS material is superconducting. The LTS core has a heat capacity sufficient to cause a temperature of the LTS to remain below a first predetermined temperature when energy is dumped from the toroidal field coil into the LTS core, and a resistivity sufficient to cause decay of the magnet's current quickly enough that the temperature of the quenched part of the HTS section remains below a second predetermined temperature According to a yet further aspect of the invention, there is provided a poloidal field coil assembly for use in a spherical tokamak. The poloidal field coil assembly comprises a first poloidal field coil, a second poloidal field coil, a quenching system, a quench protection system, and a cooling system. The first poloidal field coil comprises high temperature superconducting, HTS, material. The second poloidal field coil comprises low temperature superconducting, LTS, material and is connected in series with the first poloidal field coil. The quenching system is associated with the second poloidal field coil and is configured to quench the second poloidal field coil. The quench protection system is configured to detect quenches in the first poloidal field coil and, in response to detection of a quench, cause the quenching system to quench the LTS material in the second poloidal field coil in order to dump stored magnetic energy into the second poloidal field coil. The cooling system is configured to cool the second poloidal field coil to a temperature at which the LTS material is superconducting. The second poloidal field coil has a heat capacity sufficient to cause a temperature of the LTS to remain below a first predetermined temperature when energy is dumped into the second poloidal field coil, and a resistivity sufficient to cause decay of the magnet's current quickly enough that the temperature of the quenched part of the first poloidal field coil remains below a second predetermined temperature.

According to a yet further aspect of the invention, there is provided a nuclear fusion reactor comprising a toroidal field coil and/or poloidal field coil assembly according to any of the above aspects.

Further embodiments of the invention are set out in claim 2 et seq.

DETAILED DESCRIPTION

As originally proposed, the $E^3$SPreSSO coils do not contribute to the magnet's field, being non-inductively wound. In accelerator magnets HTS coils are often used in the form of an insert coil nested inside a larger $Nb_3Sn$ LTS coil to boost the field of a dipole magnet. In this case they would be operated in LHe at 4.2 K or below. The $E^3$SPreSSO coils may share a cryostat and/or cooling means with the HTS and LTS magnets.

When applied to a tokamak, several improvements can be made to the $E^3$SPreSSO system. The toroidal field coil of a tokamak has a characteristic "D-shape" with the straight sections clustered in the central column, where their magnetic fields are superimposed, and separate return limbs, whose magnetic fields are relatively isolated. This results in the net field at the central column being much higher than the field in the return limbs distant from the central column. In addition, it is vital to keep the central column of a tokamak as small in diameter as possible, so space in the central column is at a premium, but the constraints on space in the return limbs are much less severe. This opens up the possibility of including an $E^3$SPreSSO-like quenchable section as a part of the return limbs. This quenchable section may be LTS or HTS, as will be described below.

The use of deliberately quenchable HTS has previously not been considered viable by the skilled person, as HTS has a minimum quench energy several orders of magnitude higher than LTS. As such, deliberately quenching large sections of HTS coils requires injecting a large energy pulse from heaters which are closely thermally coupled to the HTS tapes in the coils, so that the temperature can be raised over a large section of coil in a matter of milliseconds. The presence of the heaters within the coil windings reduces the engineering current density. If these coils contribute to the magnetic field the tesla-per-amp efficiency of the magnet would be severely degraded. However, in the return limbs of a toroidal field coil, the engineering current density of the HTS is less important because the return limbs effectively only need to provide a return current path for the central column, and do not significantly contribute to the flux density at the major plasma radius.. It is therefore acceptable to space apart the HTS tapes in the coils allowing space for heaters to be inserted between tapes which are tightly thermally coupled to the tapes. Indeed, it is actually advantageous to spread out the HTS tapes in the limbs to some extent to reduce the peak B-field in the return limbs.

Alternatively, the lower field at the return limbs would allow inexpensive NbTi at 6 K or below (or other LTS conductor at appropriate temperature) to be used in the lower field portions of the return limbs, whilst retaining HTS in the central column and the parts of the return limbs that see the highest magnetic flux density. In contrast to the disclosed $E^3$SPreSSO concept, the LTS segments of the return limbs do contribute to the magnet's field. The LTS segments therefore have inductance. In ST devices with larger major radius (>~2-3 m) there will be enough radial space between the superconducting central column and the plasma for a neutron shield which is thick enough to allow operation of the whole magnet, both HTS and LTS segments, at the same temperature, 6 K or lower for NbTi. However, a smaller device, having plasma radius around 1.4-2 m is thought to provide optimal cost/performance. In this case the neutron shield would be too thin to allow cost effective cooling of the HTS central column at the same temperature, 6 K or lower, as the LTS return limbs. It is therefore preferred for the HTS central column to operate at a higher temperature than the LTS sections, in the range 6 K to 20 K. This in turn necessitates that the horizontal HTS portions of the return limbs have a temperature gradient along them, and operate as current leads. There is a net flow of heat from the central column to the LTS segments in the return limbs which must be minimized to keep overall cryogenic cooling power to less than a few percent of the generated fusion power.

A fast quench protection method such as the CLIQ heaters used in E³SPreSSO would be directly integrated within the LTS portion of the return limbs, to simultaneously quench them if a quench in any of the HTS segments were detected. As will be seen, this innovation leads to several other advantages.

In either case, the basic concept is the same—return limbs can be include superconducting material, and constructed such that they have sufficient heat capacity to absorb the stored energy of the magnet, and provide a means to quench the superconducting material of those return limbs "on demand" if a hot spot is detected in the toroidal field coil.

The principle difference between the two approaches is the amount of heat required to quench the return limbs quickly when a hot-spot is detected anywhere in the magnet. The fact that the minimum quench energy of HTS is several orders of magnitude higher than LTS means that HTS coils are inherently stable compared to LTS coils. Indeed, it is well known that LTS coils are prone to spontaneous quenching, particularly during ramping of the magnet. This is not observed in HTS magnets. Use of HTS in the quenchable sections is preferred for this reason, but this must be balanced against the extra cost of HTS and the substantially higher heater powers needed to quench the quenchable sections on demand.

Figure 1A:
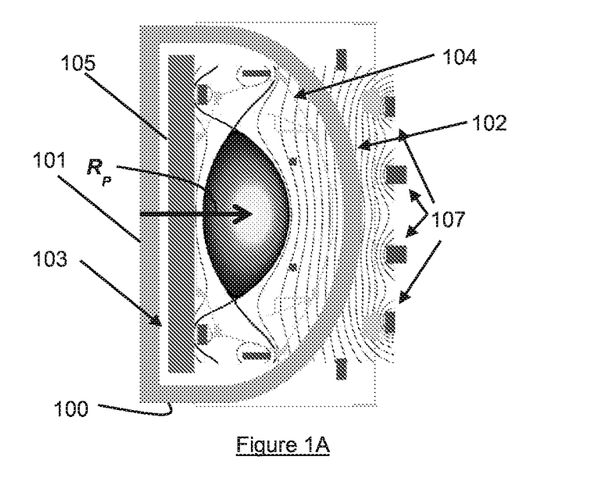
FIGS. 1A and 1B are schematic drawings of exemplary toroidal field coils according to an embodiment.

FIG. 1A is a schematic illustration of a cross section (elevation view, half section) through a compact spherical tokamak. The tokamak includes a plasma confinement magnet capable of generating a static toroidal magnetic flux density $B_T$ of a 3-4 Tesla at the major radius $R_P$, in the range 1.4 m. To generate this field, a current of approximately 20-30 MA must flow axially in a central column 101 of a toroidal field (TF) magnet 100. FIG. 1A shows one coil of the TF magnet 101: it will be appreciated that there are many such coils arranged azimuthally around the tokamak. FIG. 1 also shows a return limb 102 of the TF coil and poloidal field coils 107, which generate an axial magnetic field used to control the position and stability of the plasma current.

The minimum radius for the superconducting core 102 for the pilot magnet is limited to approximately 20-25 cm by peak magnetic stress and provision of sufficient copper stabilizer to limit the rate of rise of hot spot temperature during a quench of the HTS. This leaves ~40 cm radial space for thermal insulation 103 of the plasma chamber 104 and magnet cryostat plus a neutron shield 105. At this radius, the required engineering current density $J_e$ in the core is ~150-200 A/mm² and the peak magnetic flux density at the surface of the core is 20-25 T.

Figure 1B:
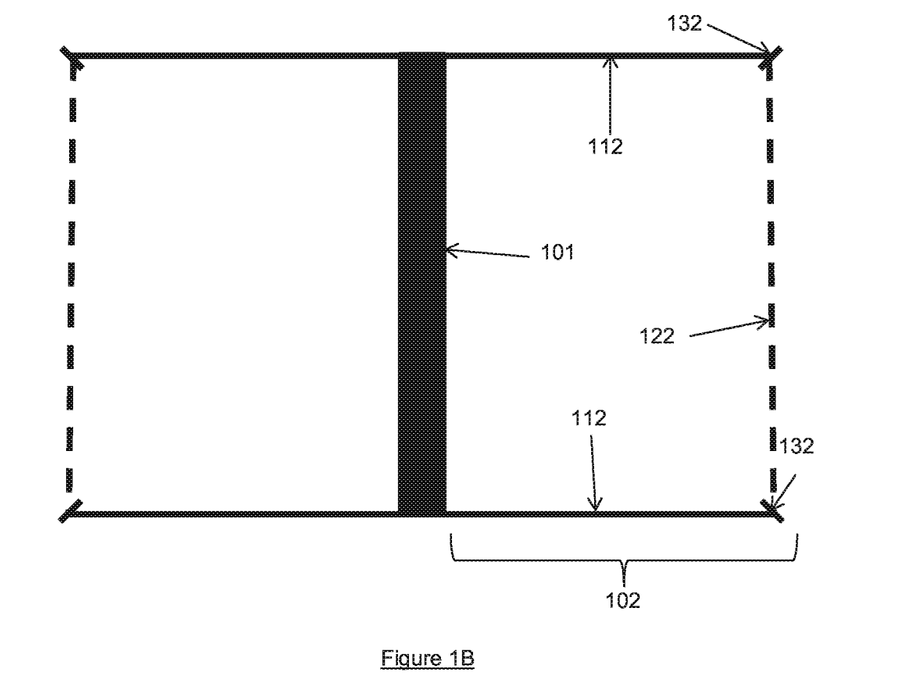

FIG. 1B is a more schematic cross section through the toroidal field magnet, which illustrates two of the return limbs 102 in more detail. While the return limbs are shown in FIG. 1B with a substantially rectangular cross section, it will be appreciated by the skilled person that many other cross sections are possible, including the D-shaped cross section of FIG. 1A. The toroidal field magnet comprises a central column 101 and a plurality of return limbs 102. The return limbs each comprise one or more HTS sections 112 and a "quenchable" section 122 ("quenchable" herein should be understood as "quenchable on demand"). Joints 132 are provided to connect the HTS and quenchable sections. The quenchable section is provided in series with the HTS sections, and is configured such that it can be quenched on demand (e.g. using heaters or other electromagnetic/AC loss means as known in the art).

The quenchable sections 122 may include LTS material. This allows some of the HTS of the magnet to be replaced with LTS, reducing the wire cost of the system but increasing the cost of the cryogenic cooling. The LTS material is preferably NbTi, which requires cooling to 6 K or lower. In a smaller ST with limited radial space for a neutron shield (as shown in FIG. 1A) the HTS central column would be operated at a higher temperature than the LTS sections.

Alternatively, the quenchable sections 122 may include HTS material. This avoids the increased likelihood of unwanted quenches in the LTS sections, and the increased cooling power requirements of LTS. The HTS quenchable sections may be operated at the same temperature as the higher-field sections of the toroidal field coil (e.g. the central column, and the other sections of the return limbs).

An exemplary toroidal field coil comprising LTS quenchable sections will now be described. The toroidal field coil has the structure shown in FIG. 1B, i.e. a rectangular cross section with the LTS quenchable sections 122 provided on the vertical parts of the return limbs, although it will be appreciated that the same considerations apply for any geometry. For the purposes of this model, the effects of the joints 132 are disregarded.

The LTS sections are cooled to 6 K or lower. In this example we assume cooling of LTS at 4.2 K, but various options are possible, such as immersion in a liquid helium bath boiling at atmospheric pressure (4.2 K), by direct or indirect helium vapour cooling (>4.2 K), or by sub-cooled LHe using a cable-in-conduit method (<=4.2 K). Heat is removed from the helium coolant by a cryoplant. Where cooling of the HTS central column is required, the same cryo-plant may be adapted to cool both the LTS and the central column, either to the same temperature in a larger toroidal field coil, or preferably to a higher temperature such as 10-20 K, in a smaller toroidal field coil, e.g. in a spherical tokamak (i.e. the cryo-plant may be adapted to provide cooling to multiple temperatures). The horizontal components 112 of the return limbs are HTS in a copper matrix, necessary for quench stabilization, and act as thermal current leads between the HTS central column and the LTS. The temperature of the horizontal components will vary from 4.2 K where they contact the LTS to 10-20K where they contact the central column. The total heat leak from the HTS central column to the LTS sections at 4.2 K will be between 100 W and a few kW depending on the length of the current lead sections, the amount of copper and other stabilizer materials used. The cryoplant power needed to maintain the LTS at 4.2

K varies from less than 0.5 MW to a few MW, which is less than 5% of the predicted fusion power output of a small ST.

An exemplary toroidal field coil comprising HTS quenchable sections will now be described. The toroidal field coil has the structure shown in FIG. 1B, i.e. a rectangular cross section with the HTS quenchable sections 122 provided on the vertical parts of the return limbs, although it will be appreciated that the same considerations apply for any geometry. For the purposes of this model, the effects of the joints 132 are disregarded.

Figure 2A:
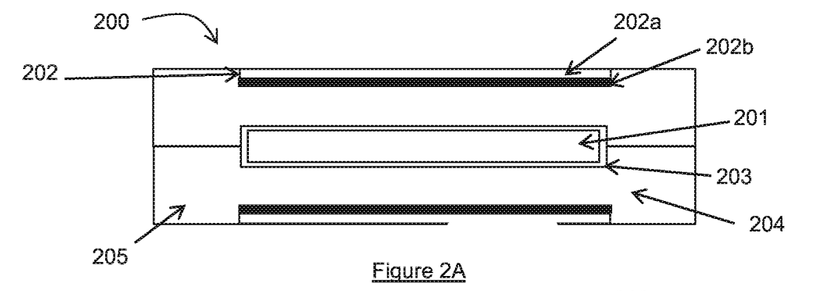
FIGS. 2A and 2B are schematic illustrations of a quenchable HTS section.
Figure 2B:
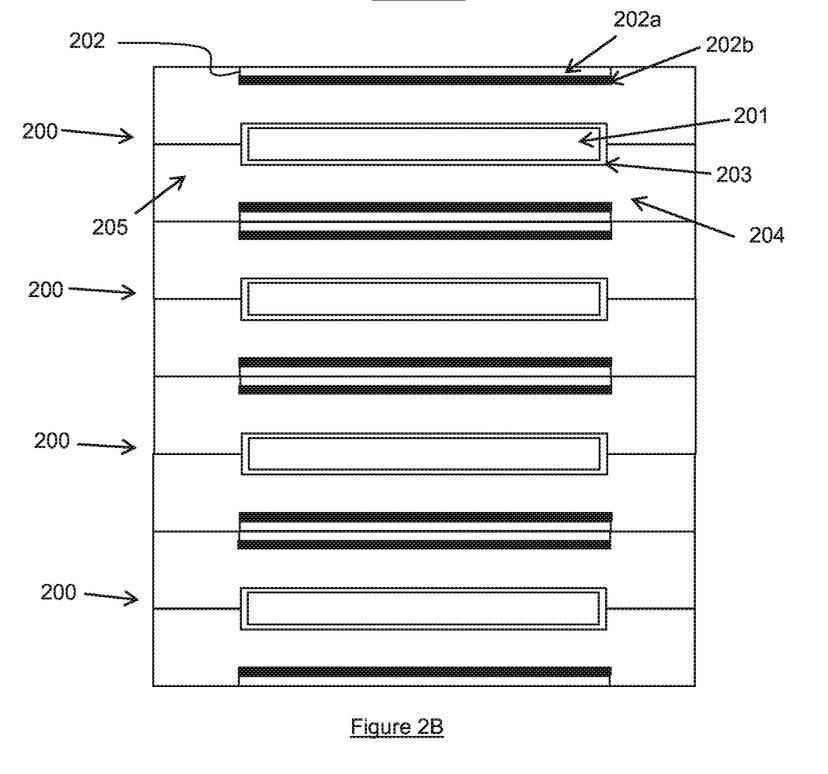

The HTS quenchable sections must be at a temperature sufficient to cause the HTS material in those sections to become superconducting. Each HTS quenchable section has heater strips laid alongside each HTS tape in that section—so that all of the HTS can be quenched at once. Optionally, some margin may be present at either end of the HTS quenchable section where the heaters are not provided. The heaters may be in the form of heater strips (e.g. kapton coated or otherwise insulated stainless steel tape) placed between pairs of HTS tapes (oriented according to the desired cable geometry). An example of this is shown in FIGS. 2A and 2B, where HTS tapes 202 comprising a substrate 202a and HTS layer 202b are laid down in type-0 pairs 200, i.e. the HTS layers 202b of adjacent strips are laid down facing each other, with a thick layer of copper 204 between them and an overhang 205 of copper to either side (which provides a current path to an adjacent type-0 pair). Heater strips 201 with an insulating coating 203 are placed between the HTS tapes 202 of each type-0 pair, embedded in the thick copper layer. FIG. 2A shows a single type 0 pair with a heater 201 embedded in it, and FIG. 2B shows a stack of such layers.

Figure 3:
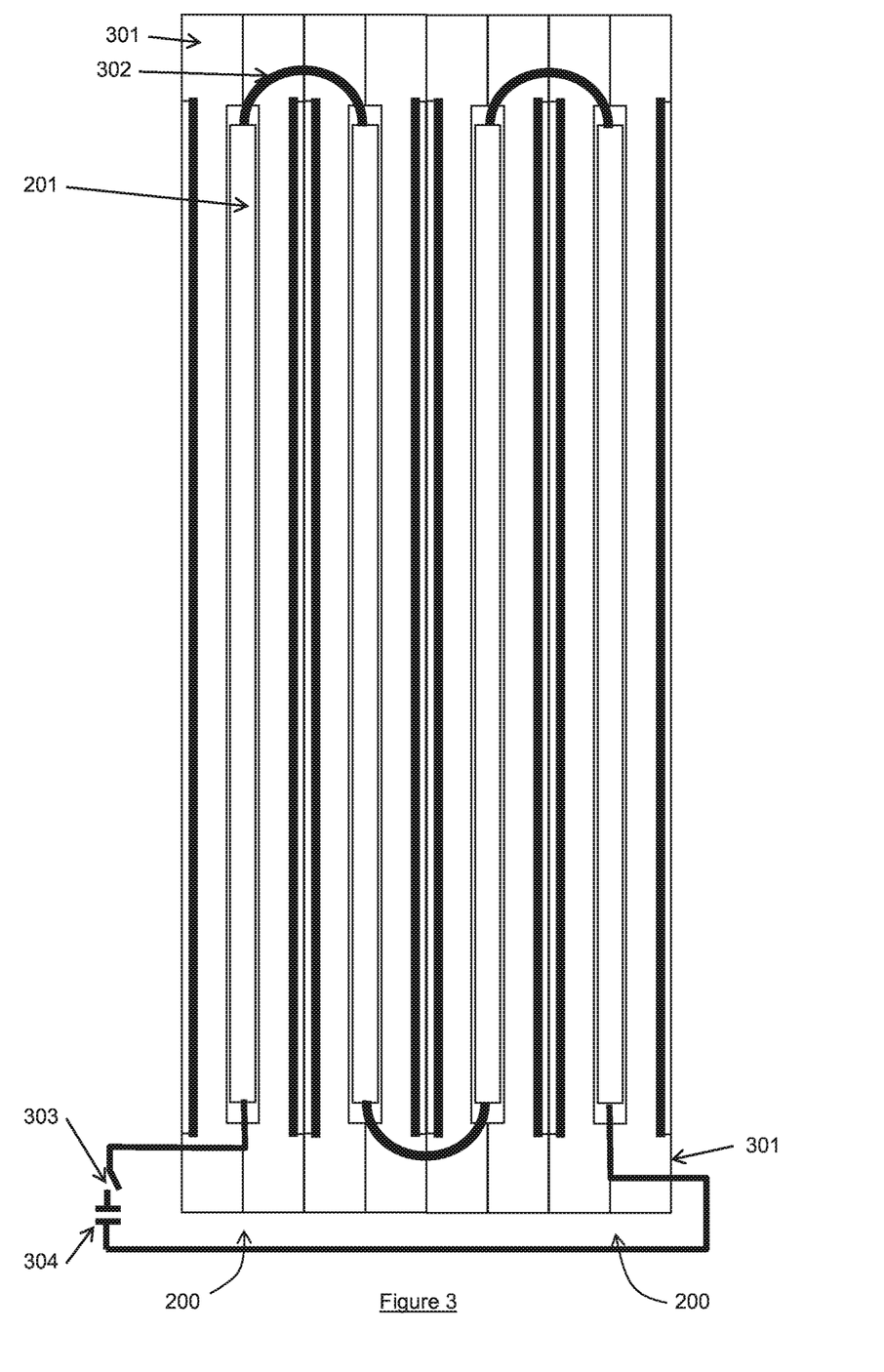
FIG. 3 is a schematic illustration of a quenchable HTS section.

The heater strips 201 should be connected non-inductively, so that a large current pulse can be driven through them in a short amount of time. FIG. 3 shows an arrangement which achieves this. Each type 0 pair 200 has a copper connector 301 at each end (which is used to connect to other sections of the toroidal field coil). The heater strips 201 are connected via wires 302 insulated from the copper, such that the direction of current flow alternates from one heater strip to the next (e.g. current flows upwards in the first and third heater strip, and downwards in the second and fourth). The first and final heater strip are connected via a switch 303 to a capacitor bank 304 which provides the required current pulse.

Adding heater strips between each pair of HTS tapes increases the resistivity between the tapes of each pair, and this increases losses when current moves between HTS tapes during a quench, or during ramping of the magnet. This may be compensated for by increasing the thickness of copper overhang 205 at the edges of the tape stack (i.e. the thickness perpendicular to the tape).

In known uses of heaters to quench HTS coils (e.g. in NMR magnet inserts), the engineering (net) current density cannot be significantly diluted so a compromise must be reached between the ability to heat the HTS and the net current density. In the case of a tokamak, because the engineering current density is not a significant consideration for the return limbs, an optimal heater arrangement where there is a heater in close thermal contact with each tape of the HTS quenchable section can be used.

The heat required to quench the HTS material in the quenchable sections will be considerable—the energy may be provided by a capacitor bank and a fast acting switch to drive a large current pulse through the heater switches if a quench is detected anywhere in the toroidal field coil.

This technique differs from quench propagation in that the HTS material in the quenchable section(s) is quenched wherever in the toroidal field coil the quench is detected—e.g. a quench detected in the central column, in the form of a small, localized hot spot, will be responded to by quenching the HTS material in the quenchable sections, rather than trying to propagate the originally detected quench.

Figure 4:
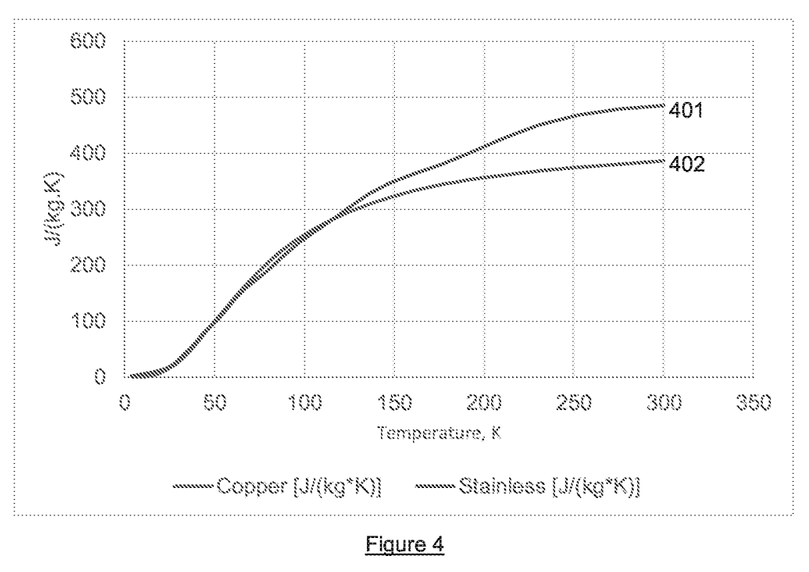
FIG. 4 is a graph of heat capacity of stainless steel and copper against temperature.
Figure 5:
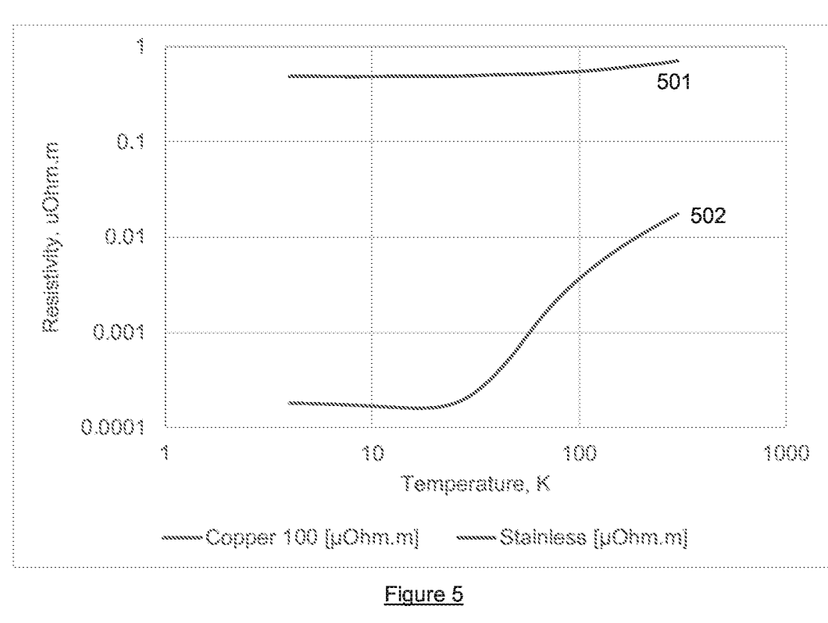
FIG. 5 is a graph of resistivity of stainless steel and copper against temperature.

In order to effectively dump energy from the magnet, the quenchable sections 122 must have a resistance when not superconducting ("normal resistance") high enough to reduce the current in the magnet quickly, and a heat capacity high enough to absorb the magnet's stored energy, certainly without melting, and preferably without rising much above room temperature. The hot-spot temperature at the HTS quench will be determined by the normal resistance of the quenchable sections (which is in part determined by the resistivity of the materials chosen), and the maximum temperature of the superconductor in the quenchable sections will be determined primarily by the heat capacity of the quenchable sections. Since the length of the quenchable sections is constrained in this example (and in general, will be somewhat constrained to avoid placing LTS in the high field region, or to avoid the use of heaters in areas where space is restricted), these are conflicting requirements. The heat capacity can be increased by increasing the cross section of the quenchable section (e.g. by increasing the cross section of non-superconducting stabiliser in the quenchable section), but this would also reduce the normal resistance. Using materials other than copper for the non-superconducting stabiliser can provide an increased heat capacity without making the normal resistance too low. For example, as shown in FIGS. 4 and 5, the heat capacity of stainless steel (401) is similar to that of copper (402), but the electrical resistivity of stainless steel (501) is higher than that of copper (502). In general, a metal where the ratio of resistivity to volumetric heat capacity of the metal is greater than that ratio for copper will be suitable.

Figure 6:
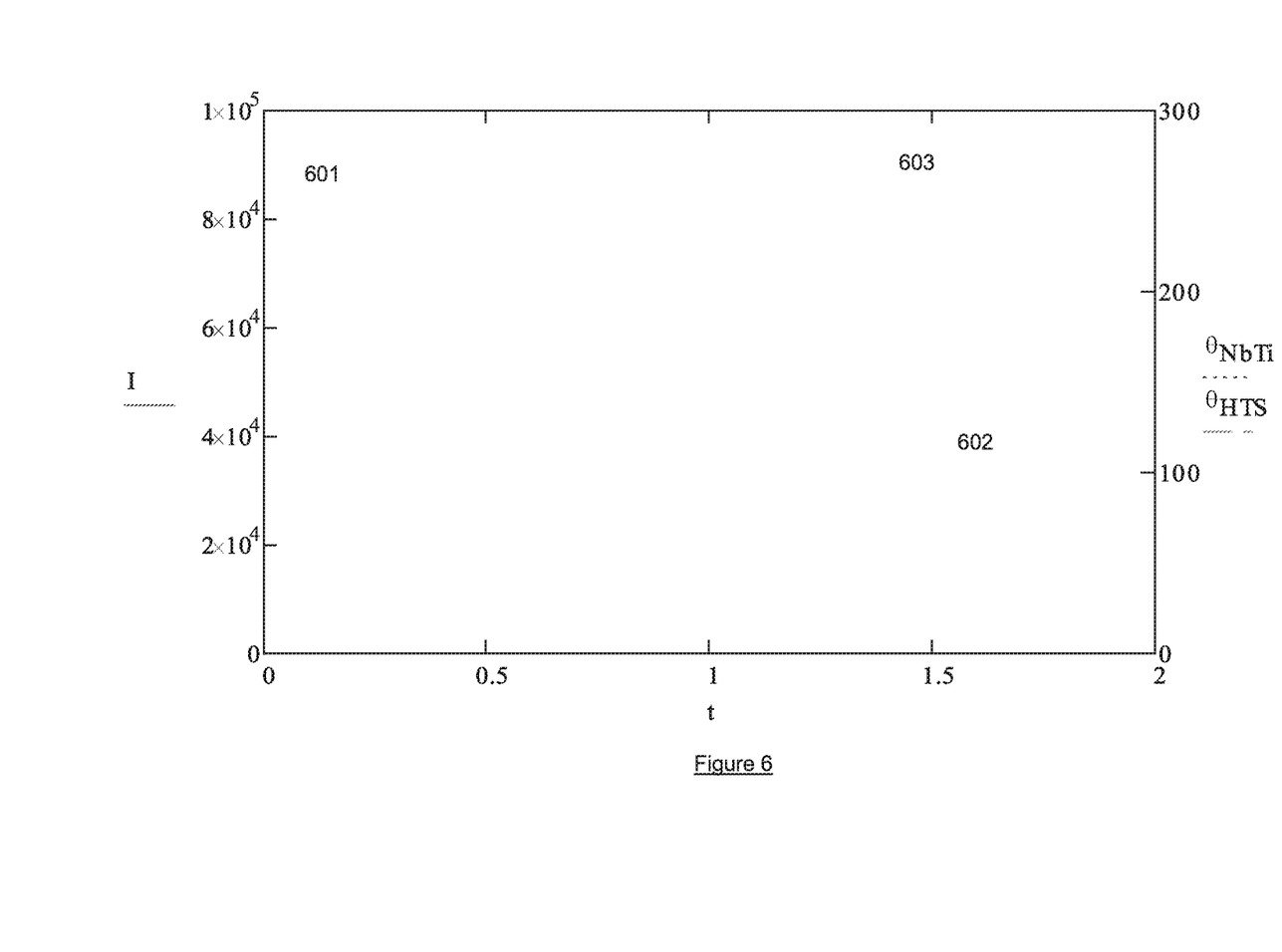
FIG. 6 is a graph of temperature and current over time following quench detection.

The non-copper stabiliser can be incorporated in addition to copper stabiliser—e.g. by providing a 1:1 ratio Cu:superconductor, or other commercially available copper stabilised superconductor, within a stainless steel matrix. Enough stainless steel should be added to limit the temperature of the superconductor to a specified value, e.g. 300K, if all of the energy of the coil is dumped into the quenchable sections. The current decay will depend on the inductance and temperature dependent resistance of the quenchable sections. Such a construction using 1:1 Cu:NbTi superconductor (NbTi being a common LTS material) is likely to limit the HTS hot spot temperature during a quench to approximately 100K, as shown in the simulation of FIG. 6, which shows the current (601), peak HTS hot spot temperature (602) and peak NbTi temperature (603) for a simulated quench. Constructions using lower Cu:superconductor superconductor may allow further reductions in peak HTS hot spot temperature, e.g. to approximately 50K at 0.1:1 Cu:superconductor, but this must be balanced against the need to preserve stability of the quenchable section.

A toroidal field magnet using conventional HTS coils would be designed with a small number of turns, each carrying a high current (eg: 12 coils of 20 turns each carrying ~100 kA for a 1.4 m major radius field of ~3 T). This approach minimises inductance and hence minimises the voltage developed across an external dump resistor when the magnet current is de-energized quickly. A rapid dump is required to limit hot spot temperature, but results in high dI/dt and hence high voltage (=L.dI/dt). Even at an operating current of 100 kA, the inductance of a 1.4 m major radius TF magnet is ~240 mH and the peak voltage across the dump resistor would be ~24 kV for a dump time of ~1 s. This can be reduced by splitting the single dump resistor into several individual lower value resistors distributed between coil sections, eg: one per TF coil. For a 12 coil TF magnet this reduces the peak voltage from the example to 2 kV, which is high but tolerable. However, each individual TF coil then requires a pair of 100 kA current leads penetrating the cryostat, with one end at the temperature of the magnet and the other end at room temperature. Such leads are very bulky and expensive, occupying valuable space around the tokamak which is needed for neutral beam heating, etc. Moreover, during normal operation the full magnet current must pass through non-superconducting circuit breakers to bypass the dump resistors. These circuit breakers introduce significant power losses. They must also be highly reliable.

In the proposed design, the external dump resistors and circuit breakers are replaced by quenchable superconducting coil sections. Furthermore the use of quenchable sections which are integrated with the toroidal field coils allows a switchable dump resistance to be provided on each turn of each coil if so desired, such that the voltage generated during current dumping can be spread across the quenchable sections. This allows an HTS toroidal field coil with integrated quenchable sections providing "dump resistance" to be constructed with a larger number of turns, and operate at lower current compared to a HTS toroidal field coil with conventional external dump quench protection. The limitation on the maximum number of turns becomes the number of joints between the quenchable sections and the rest of the magnet, of which there are two per turn. These are inherently lossy (being HTS-copper-(HTS or LTS) in practice), so add to the total cryogenic heat load. Lowest system cost will be achieved by choosing the optimum number of turns that balance the cost saving of lower transport current with the cost of additional joints and joint cooling.

Figure 7:
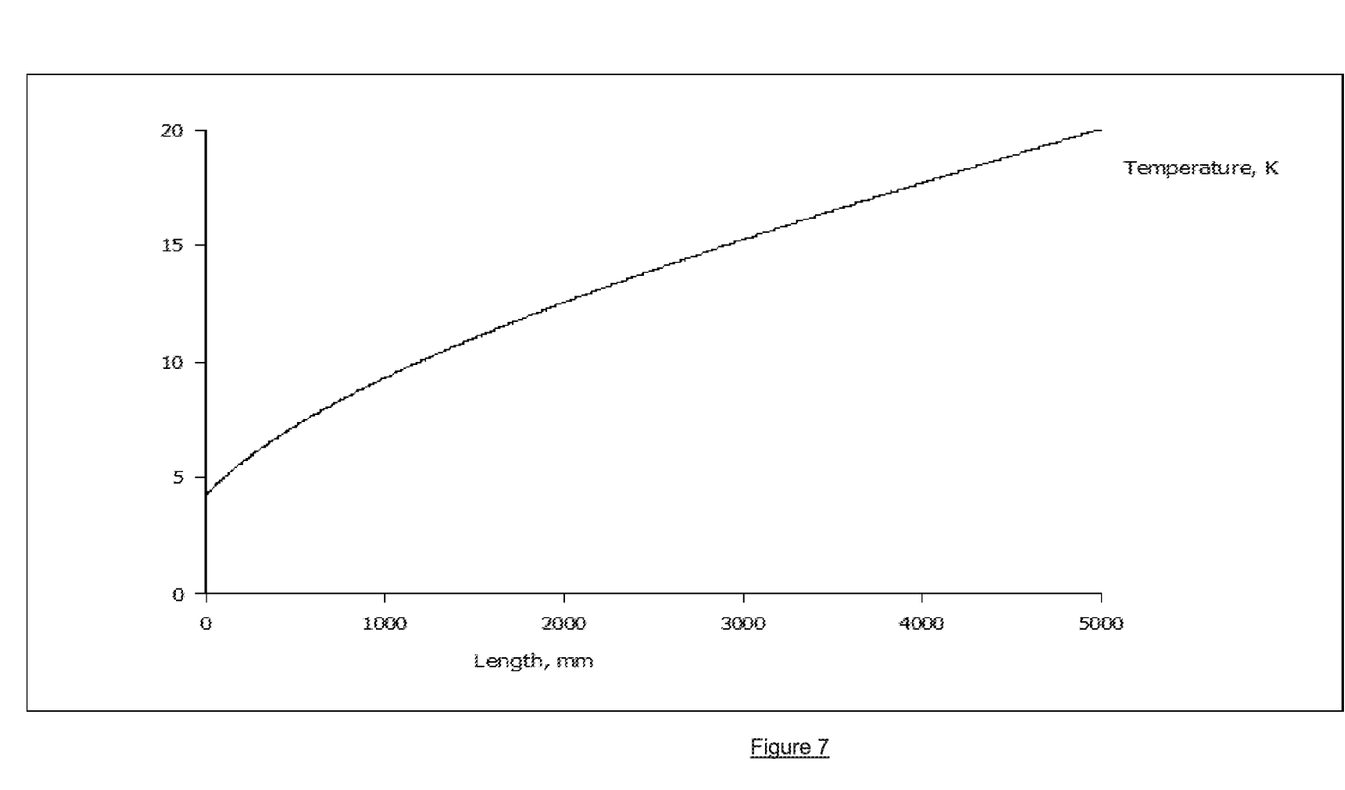
FIG. 7 is a graph of temperature in a return limb according to one embodiment.
Figure 8:
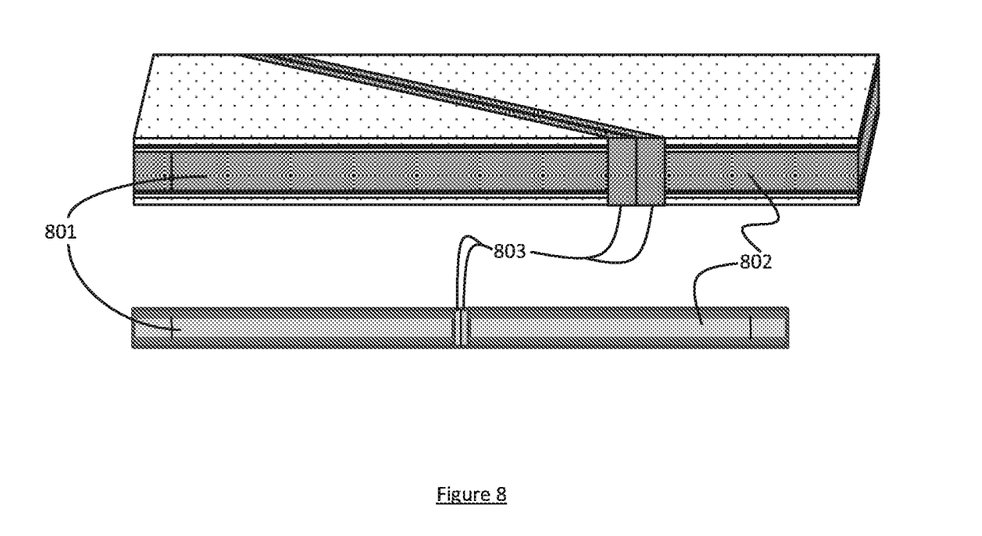
FIG. 8 is a schematic diagram of a joint according to one embodiment.
Figure 9:
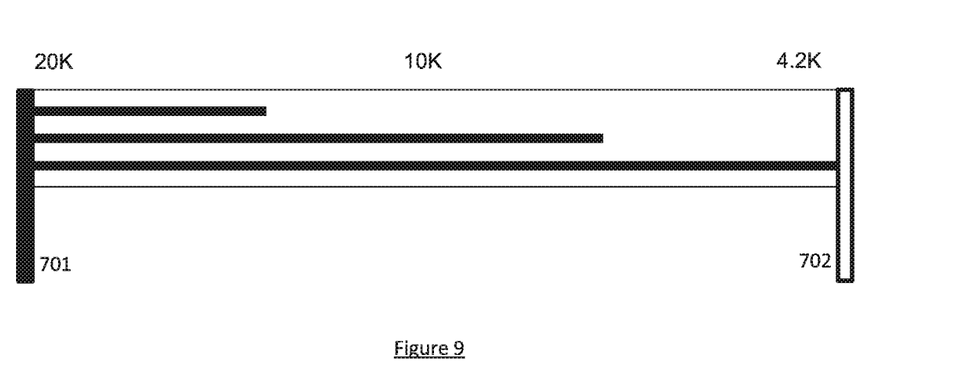
FIG. 9 is a schematic diagram of a section of a return limb according to one embodiment.

The joints may be constructed as HTS-Cu—Cu-(HTS or LTS) joints, e.g. as shown in FIG. 8 by joining an HTS section 801 with a copper terminator 803 to an HTS or LTS quenchable section 802 with a copper terminator 803. The sections are shown as layers of HTS/LTS tape on a copper core, but other constructions are possible. The Cu—Cu joint may be soldered, or it may be pressed to allow the quenchable section to be demounted easily (e.g. to dismantle to toroidal field coil in order to access components within the coil). Optimally the joints will be soldered using a lower melting point solder than that used to assemble the turn conductors from stacks of individual HTS tapes and stabilizer.

Where LTS is used for the quenchable sections, the HTS elements of the return limbs may be constructed to reduce the heat load on the LTS sections, and/or to further decrease the cost. For example, brass may be used instead of copper as the matrix for the HTS sections 122—brass has similar electrical properties to copper, but lower thermal conductivity, which will result in less heat being conducted from the central column to the LTS sections. Alternatively or additionally, the HTS conductor fraction may be reduced along the HTS sections, to take advantage of the temperature gradient, as shown schematically in FIG. 9. The number of HTS tapes used is greater towards the central column 701 (at 20K) and reduced towards the LTS section 702 (at 4.2K). The temperature gradient for an HTS return limb section using a conventional copper matrix is shown in FIG. 7. As the critical current of the HTS will increase as the temperature decreases, less HTS will be required closer to the LTS sections, and more will be required closer to the central column. This reduction may be in addition to any reduction in HTS conductor fraction to take advantage of the reduced magnetic field strength further from the central column.

As an alternative or in addition to integrating a quenchable section with the return limbs, quenchable LTS may be integrated with the central column. This can be done by providing the LTS in the centre of the central column (i.e. along its axis), where the magnetic field will be reduced compared to the outside of the central column. Sufficient matrix material must be provided for the LTS to ensure that it has enough heat capacity to absorb the energy of a quench, and the toroidal field coil should be wound so that any HTS is connected in series to the LTS (though not necessarily on the same turn).

LTS may also be integrated with poloidal field coils comprising HTS. However, since poloidal field coils are typically only made with HTS for use in regions where LTS would be unsuitable (e.g. due to high magnetic fields), providing an LTS section of the coil is unlikely to be possible in the way described above for toroidal field coils. Instead, a poloidal field coil in a high field location may be paired with a poloidal field coil in a low field location. The poloidal field coil in the high field location comprises HTS, and the poloidal field coil in the low field location comprises LTS. The high field and low field poloidal field coils are in series with each other. When a quench is detected in the HTS poloidal field coil, the LTS poloidal field coil is quenched (in the same manner as quenching the LTS section of the toroidal field coil described above). Effectively, the LTS poloidal field coil acts as a resistive load for the HTS poloidal field coil.

In general, the same design consideration described above with relation to the LTS quenchable section of a toroidal field coil also apply to the LTS poloidal field coil—in particular, the need for cooling, and the choice of materials for the non-superconducting stabiliser to ensure that there is sufficient heat capacity in the LTS coil to keep the temperature of the LTS below a predetermined value, and sufficient resistivity to cause decay of the magnet's current quickly enough that the temperature of the quenched part of the HTS section stays below a predetermined value. Handling these conflicting requirements for the poloidal field coil is likely to be easier than for the toroidal field coil, as the LTS poloidal field coil will be larger than the HTS coil in most cases.

The invention claimed is:

1. A toroidal field coil comprising a central column comprising high temperature superconducting, HTS, material and a plurality of return limbs, each return limb comprising:
 a quenchable section comprising superconducting material, the quenchable section being configured to contribute towards a magnetic field of the toroidal field coil;
 two high temperature superconducting, HTS, sections comprising HTS material, wherein the HTS sections electrically connect the quenchable section to the central column and are in series with the central column and the quenchable section; and
 a quenching system associated with the quenchable section and configured to quench the quenchable section;
the toroidal field coil further comprising:
 a quench protection system configured to detect quenches in the toroidal field coil and, in response to detection of a quench, cause the quenching system to quench the superconducting material in one or more of the quenchable sections in order to dump energy from the toroidal field coil into the one or more quenchable sections;

a cooling system configured to cool each quenchable section to a temperature at which the superconducting material is superconducting;

wherein each quenchable section has a heat capacity sufficient to cause a temperature of the quenchable section to remain below a first predetermined temperature when energy is dumped from the toroidal field coil into the quenchable section, and a resistivity sufficient to cause decay of current in the toroidal field coil quickly enough that the temperature of a location of the quench detected by the quench protraction system remains below a second predetermined temperature.

2. A toroidal field coil according to claim 1, wherein each quenchable section further comprises a non-superconducting stabiliser.

3. A toroidal field coil according to claim 2, wherein the non-superconducting stabiliser comprises a metal having a ratio of resistivity to volumetric heat capacity greater than that of copper.

4. A toroidal field coil according to claim 1, wherein the quenchable sections comprise LTS material.

5. A toroidal field coil according to claim 4, wherein the cooling system is configured to cool the quenchable sections to 4.2 K.

6. A toroidal field coil according to claim 4, wherein the cooling system is configured to cool the quenchable sections to a lower temperature than a temperature of the central column during operation of the toroidal field coil, such that the two HTS sections act as current leads having a temperature gradient along them.

7. A toroidal field coil according to claim 4, wherein each quenching system is configured to cause a quench by one of heating the LTS material or inducing alternating current losses in the LTS material.

8. A nuclear fusion reactor comprising a toroidal field coil assembly according to claim 1.

9. A nuclear fusion reactor according to claim 8 which reactor is a spherical tokamak reactor.

10. A toroidal field coil according to claim 1, wherein the quenchable sections comprise HTS material and heaters laid adjacent to the HTS material, wherein the quench protection system is configured to quench the superconducting material in the quenchable sections by causing the heaters to heat the HTS material.

11. A toroidal field coil according to claim 10, wherein the quenchable sections are constructed as stacks of type-0 pairs of HTS tapes, wherein each type-0 pair has a heater strip embedded in copper between the HTS tapes.

12. A toroidal field coil according to claim 11, wherein the heater strips are connected such that current flows along adjacent heater strips is in opposite directions.

13. A toroidal field coil according to claim 1, wherein said first predetermined temperature is 700 K.

14. A toroidal field coil according to claim 1, wherein said second predetermined temperature 300 K.

15. A toroidal field coil according to claim 1, wherein the HTS sections and the central column are cooled only by thermal contact with the quenchable sections.

16. A toroidal field coil according to claim 1, wherein the cooling system is further configured to cool the central column to a temperature at which the HTS material is superconducting.

17. A toroidal field coil according to claim 1, wherein each of the HTS and quenchable sections comprises a joint with copper elements electrically connected to the HTS or superconducting material, and wherein the HTS and quenchable sections are connected via the copper elements.

18. A toroidal field coil according to claim 1, wherein the quench protection system is configured to detect quenches in the central column and/or HTS sections.

19. A toroidal field coil comprising a central column and a plurality of return limbs comprising turns of high temperature superconducting, HTS, material, the central column comprising:

a low temperature superconducting, LTS, core comprising LTS material, the LTS core being configured to contribute towards a magnetic field of the toroidal field coil;

a high temperature superconducting, HTS, outer layer surrounding the LTS core and comprising HTS material;

the LTS core being in series with at least some turns of the return limbs and comprising a quenching system configured to cause a quench in the LTS core;

the toroidal field coil further comprising:

a quench protection system configured to detect quenches in the plurality of return limbs or HTS outer layer and, in response to detection of a quench, cause the quenching system to quench the LTS material in the core in order to dump energy from the toroidal field coil into the LTS core;

a cooling system configured to cool the LTS core to a temperature at which the LTS material is superconducting;

wherein the LTS core has a heat capacity sufficient to cause a temperature of the LTS to remain below a first predetermined temperature when energy is dumped from the toroidal field coil into the LTS core, and a resistivity sufficient to cause decay of current in the toroidal field coil quickly enough that the temperature of a location of the quench detected by the quench protection system remains below a second predetermined temperature.

20. A poloidal field coil assembly for use in a spherical tokamak, the poloidal field coil assembly comprising:

a first poloidal field coil comprising high temperature superconducting, HTS, material;

a second poloidal field coil comprising low temperature superconducting, LTS, material and connected in series with the first poloidal field coil;

a quenching system associated with the second poloidal field coil and configured to quench the second poloidal field coil;

a quench protection system configured to detect quenches in the first poloidal field coil and, in response to detection of a quench, cause the quenching system to quench the second poloidal field coil in order to dump stored magnetic energy into the second poloidal field coil;

a cooling system to cool the second poloidal field coil to a temperature at which the LTS material is superconducting;

wherein the second poloidal field coil has a heat capacity sufficient to cause a temperature of the LTS to remain below a first predetermined temperature when energy is dumped into the second poloidal field coil, and a resistivity sufficient to cause decay of current in the first poloidal field coil quickly enough that the temperature of a location of the quench detected by the quench protection system remains below a second predetermined temperature.

* * * * *